United States Patent [19]

Krimmel et al.

[11] Patent Number: 4,931,229

[45] Date of Patent: Jun. 5, 1990

[54] METHOD AND APPARATUS FOR PROTECTING A SCREW EXTRUDER PRODUCING STRAND-SHAPED EXPLOSIVES AND PROPELLANTS

[75] Inventors: Heinz Krimmel, Korntal; Manfred Muller-Sybrichs, Ditzinger; Rolf Schilling, Gerlingen; Ulrich Weller, Bietigheim-Bissingen, all of Fed. Rep. of Germany

[73] Assignee: Werner & Pfleiderer GmbH, Stuttgart, Fed. Rep. of Germany

[21] Appl. No.: 366,739

[22] Filed: Jun. 15, 1989

[30] Foreign Application Priority Data

Jun. 24, 1988 [DE] Fed. Rep. of Germany ....... 3821311

[51] Int. Cl.⁵ .............................................. C06B 21/00
[52] U.S. Cl. .................................. 264/3.3; 149/109.6; 422/163
[58] Field of Search ...................... 264/3.3; 149/109.6; 422/163

[56] References Cited

U.S. PATENT DOCUMENTS 4,335,063  6/1982  Kolb et al. .......................... 264/3.3
4,525,313  6/1985  Muller ................................. 264/3.3
4,585,600  4/1986  Rollyson et al. .................... 264/3.3

*Primary Examiner*—Peter A. Nelson
*Attorney, Agent, or Firm*—Ladas & Parry

[57] ABSTRACT

A method and apparatus for protecting a mixing apparatus for producing strand-shaped explosives and propellants in a twin-shaft screw extruder, the housing of which is formed of housing parts connected to a clamping device acting under hydraulic pressure. In order to compensate for excessive pressure and to prevent abrupt opening of the mixing chamber, the torque developed at the screw shafts is continuously monitered and fed to a control and storage device together with temperature and pressure values measured at the end of the screw shaft in the material being processed. If one of the measure values exceeds a permissable limit, a signal is produced to change the operating condition of the screw extruder, particularly to stop and withdraw the extruder from the housing, to halt the drive motor of the extruder shafts and to open the extruder housing by relieving the clamping device.

19 Claims, 5 Drawing Sheets

METHOD AND APPARATUS FOR PROTECTING A SCREW EXTRUDER PRODUCING STRAND-SHAPED EXPLOSIVES AND PROPELLANTS

FIELD OF THE INVENTION

The present invention relates to a method and apparatus for protecting a screw extruder producing strand-shaped explosives and propellants.

The invention particularly relates to a twin shaft screw extruder whose housing comprises a plurality of housing parts connected by clamping means.

DESCRIPTION OF PRIOR ART

DE-PS No. 2,825,567 discloses a method for the production of mixtures of explosives in a screw extruder whose housing is formed of several housing sections and in which various technical process parameters, such as, among others, the torque delivered to the screw extruder, and the temperature and pressure of the composition are transmitted to a measuring station separate from the screw extruder and monitored thereat. The measuring station serves as an operating station for necessary intervention into the course of the process. Aside from this, there are no means disclosed for protecting the mixing process in the screw extruder against the constant danger of an explosion.

A safety device for extruder housings for preventing impermissible increases in the pressure of a plastic melt in the extruder is disclosed in DE-PS No. 2,707,351, in which the housing is comprised of parts connected to each other by relaxed pressure elements which retain the housing parts when they are pressurized beyond their strength values.

This does not protect the mixing process itself or brace the housing parts in the operating condition.

Furthermore, the safety device in this patent is inapplicable to a screw extruder adapted for the production of strand-shaped explosives and propellants, in view of the detonation wave which is suddenly propagated in case of an explosion.

This is also true for the screw extruder for the production of pyrotechnical compositions disclosed in DE-PS No. 2,642,153, in which safety of the screw extruder is effected by intended rupture of clamp bolts at designated locations with subsequent swinging open of the screw housing, which is divided into two halves.

Such safety devices provided with safety bolts of reduced strength will not prevent the destruction of machine parts and the related endangering of further equipment and operating personnel.

SUMMARY OF THE INVENTION

It is an object of the invention to avoid the above noted disadvantages by providing a suitable protection for the mixing process and of the screw extruder which, in case of danger, is immediately active to compensate for excess pressure but which prevents an abrupt opening of the mixing chamber.

The above and further objects are achieved in accordance with the invention by continuously measuring the torque at which the screw shafts are driven and the pressure and temperature of the material in the housing after mixing by the screw shafts, and comparing the measured values of torque, temperature and pressure with respective predetermined limit values thereof. In the event any one of the measured values exceeds the respective limit value, the drive of the screw shafts of the screw extruder is halted, the screw shafts are withdrawn from the housing and the housing parts are unclamped by relieving hydraulic pressure acting thereon.

The hydraulic pressure is developed by a hydraulic clamping means which presses the housing parts of the housing against one another in clamped condition via a counterpressure plate and distributor and retainer plates. The hydraulic clamping device includes a piston cylinder unit having a cylinder, a piston in the cylinder, a piston rod secured to the piston and to the retainer plate, whereas the cylinder is connected to the pressure plate, the extruder screw having a longidutinal axis of rotation and the cylinder, piston and piston rod being parallel to the longitudinal axis.

As is known, the production of explosives and propellants in a screw extruder takes place at relatively high pressures and temperatures, so that there is the constant danger of an autocatalytic reaction and of the material being processed catching fire.

A special feature of the process resides, on the one hand, in the fact that the mixing process, which is determined by means of essential parameters, is not only continuously monitored but is also specifically influenced by the elimination of any dangerous factors which occur. Such dangerous factors arise as a result of exceeding the temperature or pressure of the composition, and the maximum permissible torque which is introduced into the material being processed. If only a single one of these parameters is exceeded, the screw extruder is immediately shut down and the extruder housing is simultaneously opened so that any increased gas pressure which develops rapidly in the case of a disturbance can immediately escape from the extruder housing. In case of a disturbance, the mixing process is interrupted and the material being processed in vented.

Furthermore, in the event of a sudden decomposition of the material being processed with a subsequent explosion, the venting does not take place abruptly, but initially against the closing pressure of the hydraulically actuated clamping means. Upon the simultaneous exceeding of one of the monitored parameters, there takes place at the same time a relieving of the hydraulically actuated clamping means.

Reaction gases which are produced in case of a disturbance, i.e. upon exceeding the monitored parameters, are immediately discharged into the ambient atmosphere even with a minute opening of the screw housing.

In the case of a detonation, the hydraulic circuit of the clamping means acts as a buffer which prevents acceleration of parts of the mass of the apparatus from taking place.

If the drive device includes a hydraulic motor, the monitoring of the torque thereof is made possible in a simple manner by including a pressure gage in the hydraulic circuit. The control and storage devices serve in this case for the monitoring both of this parameter and of the pressure of the composition and the temperature at the screw end, for the purpose of changing the operating conditions, i.e. shutting down the extruder and opening the extruder housing for complete relief of the internal pressure in the housing.

Furthermore, the method of the invention makes the opening of the extruder possible in simple manner by relieving the clamping means and moving the housing parts away from one another to enable the complete cleaning of all parts of the extruder. The construction of the apparatus permits a sealed assembly of all housing parts. The closing pressure obtained in this respect by actuation of the piston of the hydraulic clamping means in the closing direction acts uniformly on all sealing surfaces of the individual housing parts. Conversely, upon relieving the closing pressure and with opposite action on the piston in the direction of opening, all housing parts can be easily separated from each other, so that the mixing chambers of the screw housing and the extruder screw are both easily accessible for cleaning.

In a further development according to the invention, the separation of the housing parts from the extruder screw takes place automatically, so that time-consuming removal of these housing parts, which is customarily done by hand with the use of tools, is eliminated.

The retainer plate at one end of the mixing cavity can be opened for inspection purposes, without separation of the other housing parts, according to a further development in which a passage bore of the cavity retainer plate is easily accessible from the outside, so that a replacement of the cavity block is possible without the removal of any further parts of the apparatus. This construction furthermore makes stepwise removal possible by first removing the cavity retainer plate before loosening the housing parts.

BRIEF DESCRIPTION OF THE FIGURES OF THE DRAWING

The invention will be described in further detail below with reference to an embodiment shown in the drawing, in which.

DETAILED DESCRIPTION OF A PREFERRED EMBODIMENT

Figure 1:
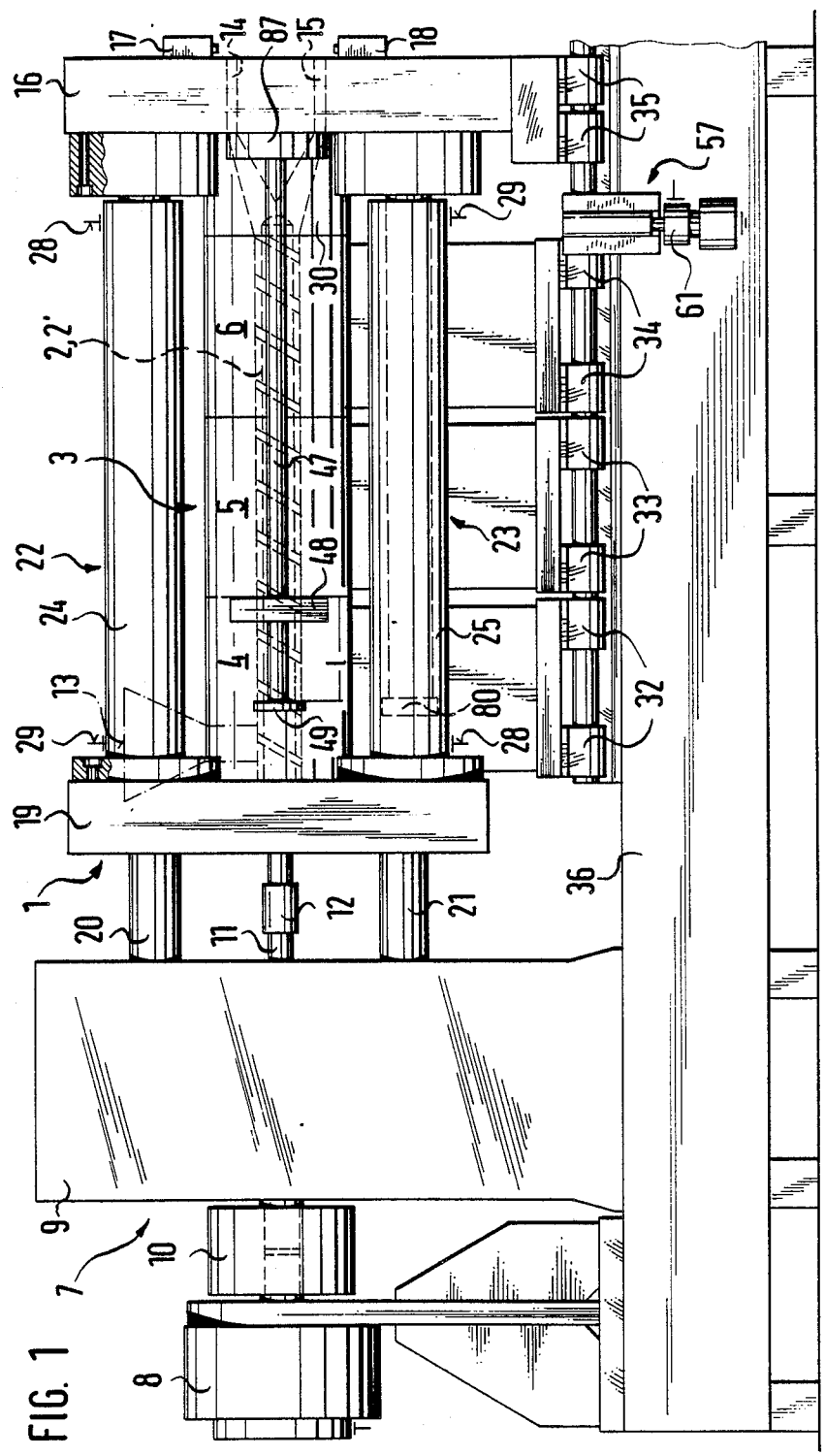
FIG. 1 is an elevation view of the screw extruder according to the invention in operating manner.

A twin shaft screw extruder 1 is shown in FIG. 1 which comprises two screws 2, 2' rotatably supported in a screw housing 3 comprised of a plurality of housing parts 4, 5 and 6. As will be described in greater detail below, the housing parts 4, 5 and 6 are tightly pressed against each other. The screw extruder 1 is driven by a drive means 7 which includes a drive motor 8 and a transmission 9. The drive motor 8 can be an electric drive motor 81 of explosion-proof type or a hydraulic motor 82. The drive motor 8 and the transmission 9 are connected to each other by a mechanical coupling 10.

The screws 2, 2' are connected to corresponding drive shafts 11 by respective couplings 12. The mechanical energy introduced through the drive means 7 is introduced into the material being processed over the entire length of the screw housing by means of the double screws 2, 2', with the formation of shearing forces, the mixing effect obtained in this connection serving for the preparation and conditioning of a strand-shaped final product.

In the extruder, solids and solvents, such as, for example, mono- and polybase propellant powder, are thoroughly mixed to form a homogeneous substance.

The addition of the solid and liquid components into the screw housing 3 takes place through a feed hopper 13. The material being processed, which is continuously worked by means of the screws 2, 2', is discharged through nozzle openings 14 and 15 in a cavity retainer plate 16, as strands which are cut into a finished product of predetermined length by cutting devices 17 and 18.

The entire treatment process takes place with sealed closure of the housing parts 4, 5, 6, which are clamped together in a manner described below, and with the cavity retainer plate 16 pressed against a distributor plate 30 and, together with the latter, against the endmost screw housing part 6. A counterpressure plate 19 resists the clamping forces and is connected in releasable manner to the screw housing 3 or the housing part 4 and also resists, via tie rods 20, 21, backpressure forces of the screws 2, 2' by means of an abutment, not shown in detail.

In order to establish a separable clamping effect, the cavity retainer plate 16 and the counterpressure plate 19 are connected by clamping means comprised of piston-cylinder units 22, 23. Cylinders 24, 25 of units 22, 23 are fastened to the counterpressure plate 19 and corresponding piston rods 26, 27 of units 23, 23 are fastened to the cavity retainer plate 16. Pressure is applied in the piston-cylinder units 22 and 23 in the direction of the closing of the housing parts 4, 5 and 6 by the introduction of pressure fluid via hydraulic connections 28 and 29 to produce a tight clamping of the housing parts 4, 5 and 6 against one another and a clamping of the retainer plate 16 against the distributor plate 30.

In the operating condition of the screw extruder 1, therefore, all housing parts forming its mixing and extrusion chambers are permanently clamped in tight manner with respect to each other under hydraulic compressive force. The action of the pressure on the piston-cylinder units 22, 23 in the direction of closing with clamping of the retainer plate 16 and of the housing parts 4, 5 and 6 takes place with a pressure of about 300 bar of hydraulic liquid. In order to prevent the opening of the screw extruder 1 under normal operating conditions, the piston 80 of each piston-cylinder unit 22, 23 is acted on by an adjustable pressure, so that its pressing force at any time is about 10% above the corresponding internal extruder pressure, which is dependent on the material being processed. The internal extruder pressure can be up to about 300 bar. The pressure in each unit 22, 23 is manually adjustable by a pressure relief valve 88. All of the piston-cylinder units 22, 23 are connected hydraulically in customary manner to a hydraulic liquid pump 67 such that absolutely uniform operation of the piston rods 26, 27 is obtained.

In the case of danger, i.e. upon suddenly exceeding the permissible pressure of the composition in the screw extruder 1, the screw housing 3 opens for immediate pressure relief at one of the sealing surfaces of the housing 4, 5, 6 which is closest to the source of danger.

In order to make it possible to open the housing parts 4, 5, 6 and the retainer plate 16 as easily as possible, these parts are mounted for displacement relative to the machine frame 36, in each case on a plurality of ball bushings 32, 33, 34 and 35.

Figure 4:
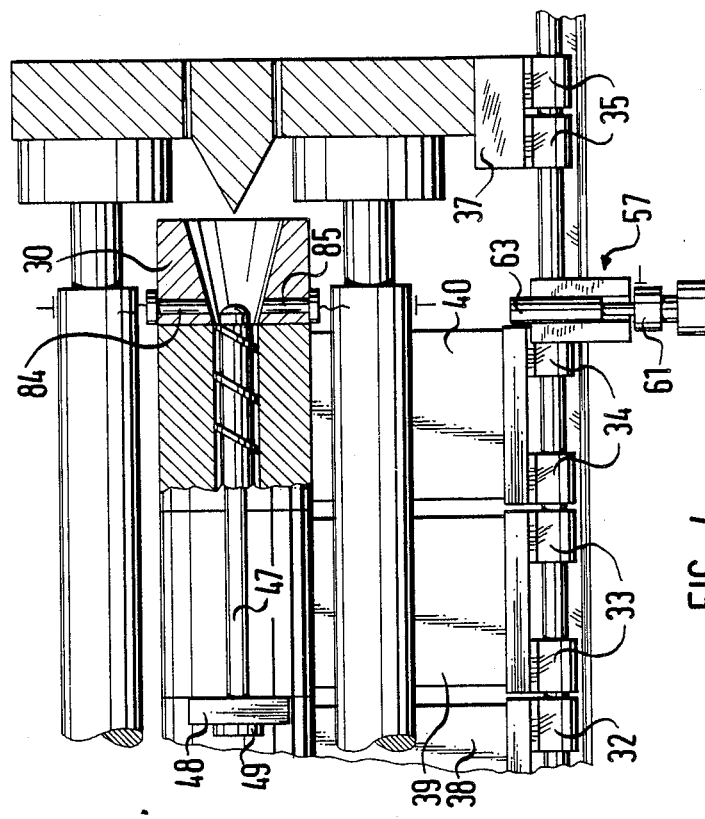
FIG. 4 is a portion of a section taken along line IV—IV in FIG. 3, with partial opening of the screw extruder, i.e. with extracted cavity retainer plate.
Figure 3:
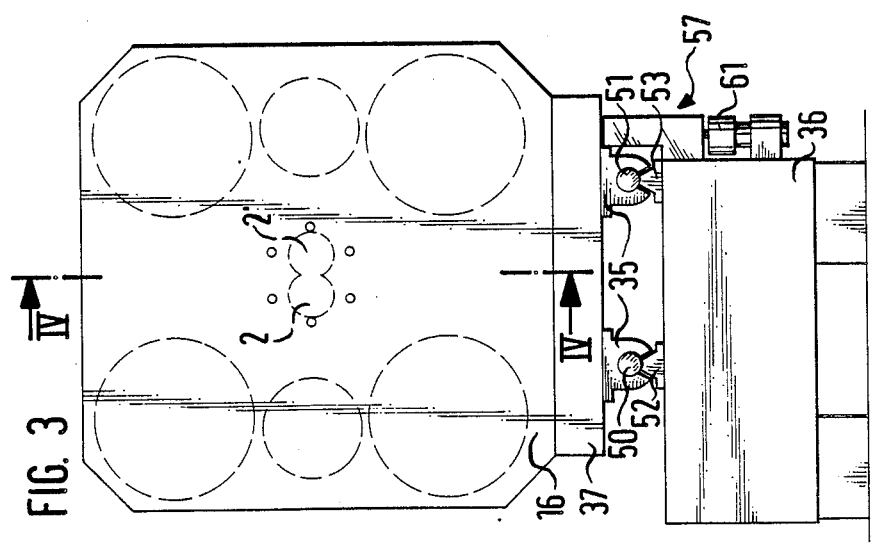
FIG. 3 is an end view of the screw extruder in the direction towards its cavity retainer plate.

The arrangement of the ball bushings 32, 33, 34 and 35 is such, as shown in particular in FIGS. 3 and 4, that they are securely connected, on the one hand, by means of a fastening plate 37 to the retainer plate 16 or, in each case, by means of additional fastening plates 38, 39 and 40 to the housing parts 4, 5 and 6. The ball bushings 32, 33, 34 and 35 are guided on sliding pistons 50, 51 of cylindrical cross section which are firmly connected to the machine frame 36 by fastening elements 52, 53.

The smooth mobility of this arrangement makes a "breathing" of the extruder housing possible, so that upon an explosively increasing excess pressure in the material being processed, a rapid opening of the housing parts 4, 5 and 6, and of the retainer plate 16, which are clamped against each other by the piston-cylinders serving as a hydraulic buffer, is assured.

The hydraulic clamping means (piston-cylinder units 22, 23) thus serves, mainly, to protect the screw extruder 1 and prevent the destruction of its components.

Figure 5:
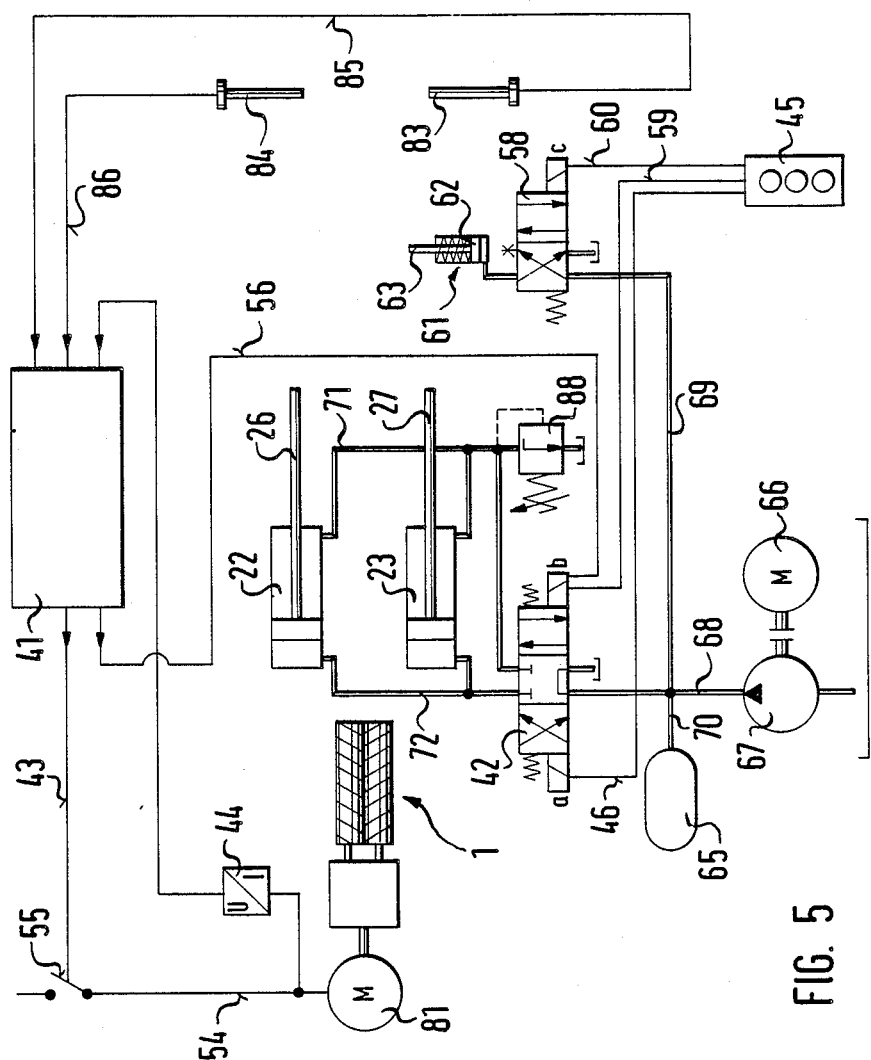
FIG. 5 is a circuit diagram of the sequential controls for an electric drive motor and the clamping means of the screw extruder.
Figure 6:
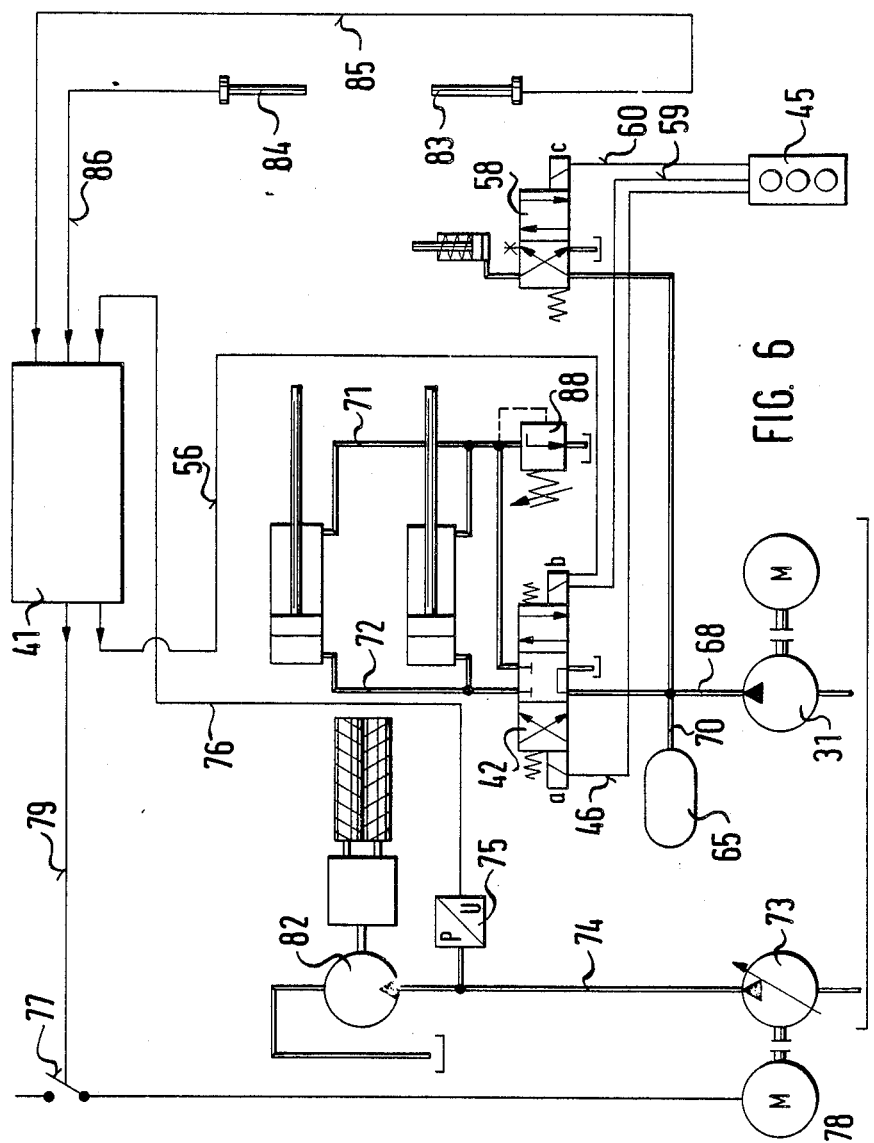
FIG. 6 is a circuit diagram of the sequential controls for a hydraulic drive motor and the clamping means of the screw extruder.

As can be seen in FIGS. 5 and 6, the screw extruder 1 is further constructed for this purpose with sequential controls, which result in protection not only in the case of a detonation of the material being processed, but also protection of the extruder in the case of danger due to excess pressure, excess temperature and increased torque in the screw extruder 1.

FIG. 5 shows a sequential controller for a drive of the screw extruder 1 by an electric motor whereas FIG. 6 shows such a controller for a hydraulic drive of the screw extruder 1. In both circuit diagrams, the hydraulic circuit for the clamping means (piston-cylinder units 22, 23) is essentially the same.

The drive of the screw extruder 1 takes place, in accordance with FIG. 5, by means of an explosion-proof electric motor 81 which can be connected to and disconnected from an electrical line 54 including a relay switch 55. The consumption of electrical current by the electric motor 81 is continuously monitored by an ammeter 44 and fed to a controlling and storage device 41 where it is compared with a stored desired value for the current.

The temperature and pressure values are respectively determined by a temperature sensor 83 and a pressure sensor 84 near the discharge end of the screw shaft and are fed to the control and storage device 41 and compared thereat with corresponding stored desired values. For this purpose, sensors 83 and 84 are connected to the control and storage device 41 by lines 85 and 86. After a positive comparison with the corresponding desired value in the control and storage device 41, a signal is derived from each of the actual values determined, the pulse of said signal acting on the relay switch 55 and on a 4/3-way valve 42. The 4/3-way valve 42 controls the piston-cylinder units 22, 23 and can be switched by means of solenoid valves a or b. If any one of the values of the torque, pressure or temperature in the screw extruder 1 exceeds the desired, comparative value, actuation of the relay switch 55 via a control line 43 takes place and the drive motor 81 is halted. The solenoid valve b is simultaneously energized via a further control line 56, so that the piston-cylinder units 22, 23 are relieved and slowly opened. This brings about an opening of the extruder housing 3 a by separation movement of the housing parts 4, 5 and 6 and the retainer plate 16. The slow outward movement of the piston rods 26 and 27 results from the forced displacement of the pressure medium present in the piston-cylinder units 22, 23. This change in the pressure medium is also the controlling cause for the fact that, upon an explosion in the screw extruder 1, its components are not flung off, but, rather, make possible a braked opening movement against the pressure medium, which acts as a buffer.

Figure 2:
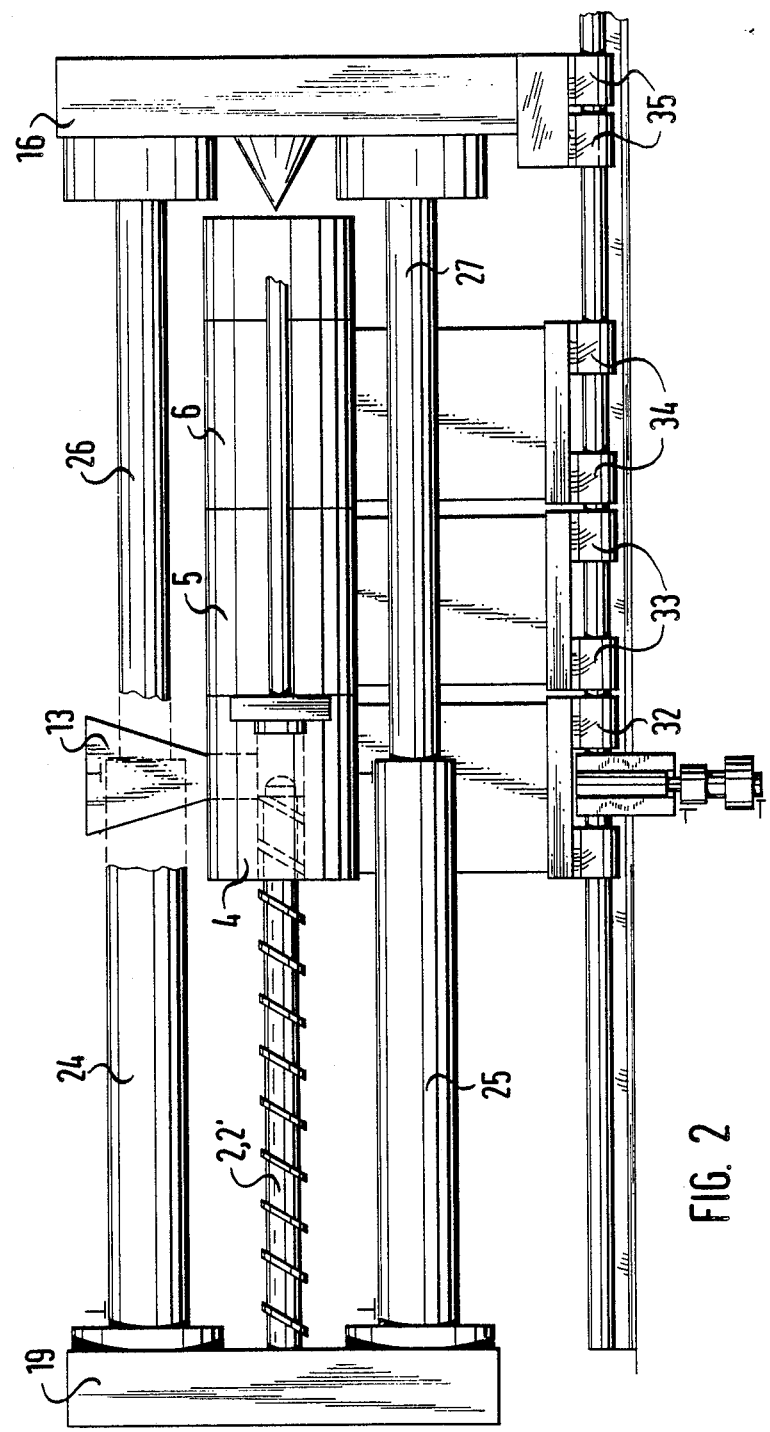
FIG. 2 is a view of a portion of the screw extruder in opened condition.

In the switch position shown for the 4/3-way valve 42, the piston-cylinder units 22, 23 are without hydraulic pressure, in extended condition in a position of rest. As shown in FIG. 2, all housing parts 4, 5 and 6 have been retracted from the two screws 2, 2' so that access to the screws 2, 2' and to the housing parts 4, 5, 6 for cleaning is made possible.

A drag rod 47 serves for the partial opening of the screw extruder 1 merely by moving the retainer plate 16 outward for the cleaning thereof.

As shown in FIG. 1, the drag rod 47 is fastened by a flange 87 to the retainer plate 16, is guided in a guide part 48, and has a driver cam 49 at a distance l from the housing part 5. The guide part 48 is fastened to the housing part 4 in the region thereof directly adjoining the housing part 5. For moving the retainer plate 11 outward, a stop device 57 is arranged on the machine frame 36, as shown in FIG. 4, for preventing separation movement of the fastening plates 38, 39, and 40 and of the housing parts 4, 5 and 6 connected to them. Upon actuation of the switch device 45, the magnet b of the 4/3-way valve is excited via the control line 59, and the magnet c of the 4/2-way valve is excited via the control line 60 according to FIG. 5 and the retainer plate 16 is moved outward by means of the piston-cylinder units 22, 23, without the housing parts 4, 5 and 6. The stop device 57 consists of a piston-cylinder unit 61 the piston 63 of which comes to rest against the fastening plate 40 of the housing part 6 when acted on by pressure against the force of a compression spring 62. In the operating condition of the screw extruder 1, i.e. with the screw housing 3 closed, the piston 63 remains in retracted position, so that the housing parts 4, 5 and 6 are free to move.

The clamping together of the housing parts 4, 5 and 6, and of the retainer plate 16, which is controlling for the operating condition of the extruder 1, takes place by actuating the switch device 45 and exciting the magnet a of the 4/3-way valve 42 via the control line 46. The piston-cylinder units 22 and 23 are in this way brought into their clamping position.

A relaxation of this clamping condition takes place, as already described, in the event of danger, by producing a signal by the control and storage device 41 in the control lines 43 and 56.

A relaxation of the clamping condition can take place, as has also already been described, by hand through the switch device 45. In order to assure the clamping action of the piston-cylinder units, 22, 23, for instance upon the occurrence of a leak in the hydraulic circuit, the latter is connected to a pressure accumulator 65. The hydraulic circuit for actuating the piston-cylinder units 22, 23 consists furthermore of a feed pump 67 driven by electric motor 66, and in communication via hydraulic lines 68 and 69 with the 4/3-way valve 42 and the 4/2-way valve 58 respectively, while the accumulator 65 is connected via a bypass 70 to the feed pump 67. The outputs of the 4/3-way valve 42 are connected by further hydraulic lines 71 and 72 to the connections 28 and 29 of the piston-cylinder units 22, 23.

If the drive means 7 of the screw extruder includes the hydraulic motor 82, then the latter, as shown in FIG. 6, is fed by means of an adjustable hydraulic pump 73 via a hydraulic line 74. The hydraulic line 74 is in this case connected to a pressure-measuring device 75, which continuously determines the pressure of the pressure fluid feeding the hydraulic motor 82 and transmits it as a measured value via an electric line 76 to the control and storage device 41. In the latter, there is effected, as described above with reference to FIG. 5, a comparison of the actual value with a desired value stored therein and when the actual value exceeds the desired value, an electrical signal is produced in line 79 which is fed to the relay switch 77 for halting the feed-pump motor 78, said signal acting at the same time on the 4/3-way valve 42 via the line 56 for opening the housing parts 4, 5 and 6 and the reatainer plate 16.

In accordance with the above, an actuating of the screw extruder 1 is obtained for protecting the mixing process in the operating condition, in which the screw housing 3 with its housing parts 4, 5 and 6 opens automatically, in the case of a detonation, against the buffer action of the hydraulic medium in the piston-cylinder units 22, 23 and the hydraulic circuit connected to the latter. This opening movement is accompanied by the immediate halting of the screw extruder 1.

Due to the inertia of the hydraulic liquid, the opening does not take place abruptly, so that the components of the screw extruder are protected against destruction.

A controlled actuation of the screw extruder 1 furthermore takes place upon an increase in the temperature and/or pressure in the material being processed, and in case excessive drive torque.

In this case also, the mixing process is made substantially safe, and the screw extruder 1 is protected against destruction.

The possibility of manually opening the screw extruder by the switch device 45 also serves to protect the mixing process and the screw extruder. The switch device is located outside the housing but in visual contact within the room in which the screw extruder 1 is located. In case of any irregularities, the housing parts 4, 5 and 6, as well as the screws 2, 2' can rapidly be completely cleaned after a waiting period and after the opening of the screw extruder 1, in order to assure the proper course of the subsequent mixing processes.

Although the invention has been described in relation to specific embodiments thereof, it will become apparent to those skilled in the art that numerous modifications and variations can be made within the scope and spirit of the invention as defined in the attached claims.

What is claimed is:

1. A safety method for protecting a mixing apparatus in which strand-shaped explosives and propellants are produced by a screw extruder, said method comprising
    forming a housing for a screw extruder of a mixing apparatus for the production of strand-shaped explosives and propellants of a plurality of separable housing parts,
    clamping the housing parts together under hydraulic pressure,
    driving screw shafts of the screw extruder in the housing with a determined torque to mix the material being processed,
    continuously measuring the torque at which the screw shafts are driven,
    measuring the temperature of the material in the housing after mixing by the screw shafts,
    mesuring the pressure of the material in the housing after mixing by the screw shafts,
    respectively comparing the measured values of torque, temperature and pressure with predetermined limit values thereof, and in the event any one of the measured values exceeds the respective limit value,
    halting the drive of the screw shafts of the screw extruder,
    separating the screw shafts from the housing, and
    unclamping the housing parts by relieving the hydraulic pressure acting thereon.

2. A method as claimed in claim 1 wherein said screw shafts have ends at which the material is discharged from the housing, said pressure and temperature of the material being measured in the vicinity of the ends of the screw shafts.

3. A method as claimed in claim 1 wherein said housing parts are unclamped under the control of a hydraulic circuit in which is effected
    pumping hydraulic fluid via a pressure accumulator to a switch valve,
    controlling said switch valve, in accordance with detection that one of the measured values exceeds its respective limit value, to relieve the hydraulic pressure acting on the housing parts, and
    activating a relay to interrupt power delivery to the drive of the screw shafts.

4. A method as claimed in claim 1 wherein the drive of the screw shafts is effected by a hydraulic motor, the measurement of the torque which acts to mix the material being effected by measuring the hydraulic pressure of said hydraulic motor.

5. A method as claimed in claim 1 comprising manually controlling unclamping of the housing parts.

6. A method as claimed in claim 5 wherein the manual control for unclamping the housing parts is effected from outside the housing.

7. A mixing apparatus including protective safety means in which strand-shaped explosives and propellants are produced, said apparatus comprising a housing including a plurality of separable housing parts,
    a screw extruder in said housing for mixing material being processed to produce strand-shaped explosives and propellants,
    means for clamping said housing parts together under hydraulic pressure,
    drive means for driving said screw extruder in the housing with a determined torque to mix the material being processed,
    means for continuously measuring the torque at which said screw extruder is driven,
    means for measuring the temperature of the material in the housing after mixing by the screw extruder,
    means for measuring the pressure of the material in the housing after mixing by the screw extruder,
    control means for respectively comparing the measured values of torque, temperature and pressure with predetermined limit values thereof,
    means for halting the screw extruder,
    means for withdrawing the screw extruder from the housing,
    means for unclamping the housing parts by relieving the hydraulic pressure acting thereon, and
    means for activating the means for halting the screw extruder, the means for withdrawing the extruder from the housing and the means for unclamping the housing parts when one of the measured values exceeds its respective limit value.

8. Apparatus as claimed in claim 7 wherein said screw extruder includes screw shafts having ends at which the material is discharged from the housing, said means for measuring pressure and said means for measuring temperature of the material comprising respective sensors disposed in the vicinity of the ends of the screw shafts.

9. Apparatus as claimed in claim 7 wherein said means for clamping said housing parts together comprises a hydraulic circuit including a hydraulic pump,
 a pressure accumulator coupled to said pump, a switch valve connected to said pump and to said accumulator for controlling flowing hydraulic fluid to said clamping means,
 means for operating said switch valve upon detection that one of the measured values exceeds its respective limit value to relieve the hydraulic pressure acting on the housing parts, and
 a relay connected to said control means and to said drive means to interrupt power delivery to the drive means fothe screw shafts when one of the measured values exceeds its respective limit value.

10. Apparatus as claimed in claim 7 wherein said drive means for the screw extruder comprises a hydraulic motor, said means for measuring the torque comprising a sensor measuring the hydraulic pressure of said hydraulic motor.

11. Apparatus as claimed in claim 7 comprising manually operated switch means for controlling the means for unclamping the housing parts.

12. A screw extruder apparatus for producing strand-shaped explosive and propellant materials under relatively safe conditions, comprising
 a housing including a plurality of adjacent housing parts arranged end to end one after the other and moveable towards and away from one another,
 a distributor plate adjacent to an endmost one of the housing parts,
 a retainer plate adjacent to said distributor plate at an outlet end of the housing,
 a counterpressure plate adjacent to an opposite endmost one of the housing parts,
 an extruder screw mounted in said housing,
 drive means for rotating said extruder screw, and
 hydraulic clamping means for pressing the housing parts against one another in clamped relation via said counterpressure plate and said distributor and retainer plates, said hydraulic clamping means including a piston-cylinder unit comprising a cylinder, a piston in said cylinder and a piston rod secured to said piston, said piston rod being secured to said retainer plate, said cylinder being connected to said counterpressure plate, said extruder screw having a longitudinal axis of rotation, said cylinder, piston and piston rod being parallel to said longitudinal axis.

13. A screw extruder as claimed in claim 12 wherein said extruder screw is removable from said housing by relative movement thereof parallel to said longitudinal axis.

14. A screw extruder as claimed in claim 12 comprising a guide secured to the opposite endmost ones of the housing parts, a drag rod extending parallel to said longitudinal axis and secured to said retainer plate end displaceably supported in said guide, and a driver on said drag rod spaced from said guide when the housing parts are clamped together.

15. A screw extruder as claimed in claim 14 comprising a fixedly supported stop means for selectively blocking movement of said housing parts from said clamped condition.

16. A screw extruder as claimed in claim 15 wherein said stop means includes a hydraulic piston-cylinder unit having a spring-loaded piston mounted in a cylinder.

17. A screw extruder as claimed in claim 14 comprising a machine frame, and ball bushings supporting said housing parts for slidable movement on said machine frame.

18. A screw extruder as claimed in claim 12 wherein said hydraulic clamping means comprises four of said piston-cylinder units spaced equally from said longitudinal axis and an adjustable pressure relief valve acting on said piston-cylinder units.

19. A screw extruder as claimed in claim 12 comprising a temperature sensor for measuring the temperature of the material in the housing, and a pressure sensor for measuring the pressure of the material in the housing, said distributor plate having openings in which said temperature sensor and pressure sensors are received.

* * * * *